US 6,556,996 B1

(12) United States Patent
Kovarik et al.

(10) Patent No.: US 6,556,996 B1
(45) Date of Patent: Apr. 29, 2003

(54) SERVICE PACKAGE APPLICATION AND A SERVICE ACTIVATION MANAGER FOR USE WITH A SERVICE CONTROL POINT IN AN ADVANCED INTELLIGENT NETWORK

(75) Inventors: James Daniel Kovarik, Batavia, IL (US); Gordon Lynn Blumenschein, Woodridge, IL (US); Ronald Stephan Urban, Woodridge, IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/116,194

(22) Filed: Jul. 15, 1998

(51) Int. Cl.[7] ............................................... G06F 17/30
(52) U.S. Cl. ..................... 707/10; 707/1; 379/221.08; 379/221.09
(58) Field of Search ............... 707/10, 1, 3; 379/221.09, 379/221.08

(56) References Cited

U.S. PATENT DOCUMENTS

| 5,377,186 | A |   | 12/1994 | Wegner et al. |
| 5,425,090 | A |   | 6/1995  | Orriss |
| 5,469,500 | A |   | 11/1995 | Satter et al. |
| 5,481,601 | A |   | 1/1996  | Nazif et al. |
| 5,488,569 | A | * | 1/1996  | Kaplan et al. ............... 709/228 |
| 5,517,562 | A |   | 5/1996  | McConnell |
| 5,526,413 | A |   | 6/1996  | Cheston, III et al. |
| 5,533,107 | A |   | 7/1996  | Irwin et al. |
| 5,535,263 | A |   | 7/1996  | Blumhardt |
| 5,539,817 | A |   | 7/1996  | Wilkes |
| 5,566,235 | A |   | 10/1996 | Hetz |
| 5,570,410 | A |   | 10/1996 | Hooshiari |
| 5,572,581 | A |   | 11/1996 | Sattar et al. |
| 5,583,926 | A |   | 12/1996 | Venier et al. |
| 5,586,177 | A |   | 12/1996 | Farris et al. |
| 5,592,541 | A |   | 1/1997  | Fleischer, III et al. |
| 5,602,909 | A |   | 2/1997  | Carkner et al. |
| 5,610,977 | A |   | 3/1997  | Williams et al. |
| 5,629,978 | A |   | 5/1997  | Blumhardt et al. |
| 5,640,319 | A | * | 6/1997  | Beuning et al. ................ 700/2 |
| 5,644,631 | A |   | 7/1997  | Sattar et al. |
| 5,680,446 | A |   | 10/1997 | Fleischer, III et al. |
| 5,890,156 | A | * | 3/1999  | Rekieta et al. ................. 707/10 |
| 6,003,031 | A | * | 12/1999 | Hartikainen et al. ........... 707/10 |
| 6,098,076 | A | * | 8/2000  | Rekieta et al. ............... 707/202 |
| 6,230,164 | B1| * | 5/2001  | Rekieta et al. ............... 707/201 |

* cited by examiner

*Primary Examiner*—Greta L. Robinson
(74) *Attorney, Agent, or Firm*—Brinks Hofer Gilson & Lione

(57) ABSTRACT

A service package application program employing a service activation manager for use with a service control point in an advanced intelligent network is disclosed. The service package application program is employed to provide multiple services to subscribing users. The services are implemented by one or more decision graph nodes stored as a plurality of independent functional blocks. The services are defined by logic maps specifying logically ordered combinations of the decision graph nodes. The service activation manager includes: a subscriber identifier in communication with a subscriber database; a service identifier in communication with a trigger database; an active services list compiler; and a service manager.

56 Claims, 14 Drawing Sheets

| Subscription Services List |
|---|
| FES |
| ACC |
| SERVICE N |

FIG. 6

| Mapped Services List |
|---|
| 300 Default |
| Service X |
| FES |
| SERVICE N |

FIG. 7

| Active Services List |
|---|
| FES |
| SERVICE N |

FIG. 8

| Service Area | CLEC |
|---|---|
| 555 | Unassigned |
| 555.111.XXXX | CLEC.1 |
| 555.123.34XX | CLEC.2 |
| ⋮ | ⋮ |
| 555.312.5XXX | CLEC.2 |
| 555.312.6543 | RBOC |
| ⋮ | ⋮ |
| NPA.NNN.XXXX | CLEC.1 |
| | |

FIG. 11

| (76) Subscription | (78) Range of Subscription | (80) Main Subscription Number | (82) Map Table | (84) GID Value |
|---|---|---|---|---|
|  | (555)-123-4567 Thru (555)-123-4632 | (555) 123-4567 | Table 1=0B8E042F Table 2=00000000 Table 3=11111111 | 8 |
| (555) 123-4633 |  | (555) 123-4567 | Table 1=00000001 Table 2=00000000 Table 3=00000000 | 25 |
| (555) 123-4634 |  | (555) 123-4634 | Table 1=0000000F Table 2=FFFFFFFF Table 3=01010101 | 1 |
| ⋮ | ⋮ | ⋮ | ⋮ | ⋮ |
|  | (555)-999-9980 Thru (555)-999-9999 | (555) 999-9980 | Table 1=0003001E Table 2=0000000F Table 3=00000000 | 0 |
| ⋮ | ⋮ | ⋮ | ⋮ | ⋮ |

FIG. 12

| | (88) | (86) |
|---|---|---|
| 0 | 0 | 31 |
| | 0 | 30 |
| | 0 | 29 |
| | 0 | 28 |
| B | 1 | 27 |
| | 0 | 26 |
| | 1 | 25 |
| | 1 | 24 |
| 8 | 1 | 23 |
| | 0 | 22 |
| | 0 | 21 |
| | 0 | 20 |
| E | 1 | 19 |
| | 1 | 18 |
| | 1 | 17 |
| | 0 | 16 |
| 0 | 0 | 15 |
| | 0 | 14 |
| | 0 | 13 |
| | 0 | 12 |
| 4 | 0 | 11 |
| | 1 | 10 |
| | 0 | 9 |
| | 0 | 8 |
| 2 | 0 | 7 |
| | 0 | 6 |
| | 1 | 5 |
| | 0 | 4 |
| F | 1 | 3 |
| | 1 | 2 |
| | 1 | 1 |
| | 1 | 0 |

FIG. 13

| | (88) | (86) |
|---|---|---|
| 0 | 0 | 31 |
| | 0 | 30 |
| | 0 | 29 |
| | 0 | 28 |
| 0 | 0 | 27 |
| | 0 | 26 |
| | 0 | 25 |
| | 0 | 24 |
| 0 | 0 | 23 |
| | 0 | 22 |
| | 0 | 21 |
| | 0 | 20 |
| 0 | 0 | 19 |
| | 0 | 18 |
| | 0 | 17 |
| | 0 | 16 |
| 0 | 0 | 15 |
| | 0 | 14 |
| | 0 | 13 |
| | 0 | 12 |
| 0 | 0 | 11 |
| | 0 | 10 |
| | 0 | 9 |
| | 0 | 8 |
| 0 | 0 | 7 |
| | 0 | 6 |
| | 0 | 5 |
| | 0 | 4 |
| 0 | 0 | 3 |
| | 0 | 2 |
| | 0 | 1 |
| | 0 | 0 |

FIG. 14

| | (88) | (86) |
|---|---|---|
| 1 | 0 | 31 |
| | 0 | 30 |
| | 0 | 29 |
| | 1 | 28 |
| | 0 | 27 |
| 1 | 0 | 26 |
| | 0 | 25 |
| | 1 | 24 |
| | 0 | 23 |
| 1 | 0 | 22 |
| | 0 | 21 |
| | 1 | 20 |
| | 0 | 19 |
| 1 | 0 | 18 |
| | 0 | 17 |
| | 1 | 16 |
| | 0 | 15 |
| 1 | 0 | 14 |
| | 0 | 13 |
| | 1 | 12 |
| | 0 | 11 |
| 1 | 0 | 10 |
| | 0 | 9 |
| | 1 | 8 |
| | 0 | 7 |
| 1 | 0 | 6 |
| | 0 | 5 |
| | 1 | 4 |
| | 0 | 3 |
| 1 | 0 | 2 |
| | 0 | 1 |
| | 1 | 0 |

FIG. 15

| (AA) Trigger Index | (BB) Trigger Criteria Type | (92) Map Table No. | (94) Bit No. |
|---|---|---|---|
| 100 | Default | 3 | 4 |
| 101 | FES | 1 | 2 |
| 102 | Service X | 2 | 11 |
| 200 | Default | 3 | 4 |
| 201 | Service Y | 3 | 30 |
| 300 | SCA | 1 | 31 |
| 301 | Service X | 2 | 11 |
| 302 | FES | 1 | 2 |
| 303 | Service N | 1 | 10 |
| ⋮ | ⋮ | ⋮ | ⋮ |
| 1800 | Default | 3 | 4 |
| 1801 | ACC | 1 | 1 |
| 1802 | FES | 1 | 2 |
| 1899 | Service Z | 3 | 15 |

FIG. 16

| Service Name | (110) Active Status | (108) Logic Map Path Name | Service Activation Counter |
|---|---|---|---|
| Default | true | Default = default.1 | 40 |
| FES | true | FES = FES.1 | 1 |
| ACC | true | ACC - ACC.1 | 8 |
| ... | ... | ... | |
| Service X | false | Service X = ServiceX.1 | 95 |

FIG. 17

SERVICE PACKAGE APPLICATION AND A SERVICE ACTIVATION MANAGER FOR USE WITH A SERVICE CONTROL POINT IN AN ADVANCED INTELLIGENT NETWORK

FIELD OF THE INVENTION

The present invention relates generally to telecommunications and, more particularly, to a service package application and a service activation manager for use with a service control point in an advanced intelligent network.

BACKGROUND OF THE INVENTION

In recent years, the advanced intelligent network (AIN) has become the preeminent telecommunications architecture. Under the AIN architecture, the control signals necessary to perform advanced call service processing and to route calls are communicated over a packet switched control signal network which is separate from the trunk lines used to transmit calls carrying voice and/or data signals. Separating the control signals from the voice and data signals (i.e., out-of-band signaling) has several advantages including freeing trunk lines for carrying calls by limiting or removing control signaling traffic therefrom; facilitating efficient call routing and network resource maximization by permitting mid-call re-routing of calls; decreasing call set-up times; and facilitating advanced call processing services such as call blocking, caller identification and call forwarding.

A portion of a typical advanced intelligent network (AIN) is schematically illustrated in FIG. 1. The conventional AIN architecture includes a number of Signal Switching Points (SSPs) 2, Signal Transfer Points (STPs) 4 and Service Control Points (SCPs) 6. SSPs 2 are end offices which have been upgraded to operate under the Signaling System 7 (SS7) protocol and the AIN protocol. STPs 4 are digital packet switching devices which route control signals between SSPs 2 and SCPs 6 and traditionally perform certain control signal processing functions discussed below. SCPs 6 are computing devices containing extensive databases of customer information. SCPs 6 are programmed with a number of logic routines (commonly referred to as "services") for providing various AIN services such as call screening to customers. The typical AIN includes a number of SCPs 6 (usually paired for failure protection via redundancy) assigned to service a particular geographic area of the network; a larger number of STPs 4 also assigned to service predefined geographic areas (typically smaller than the areas services by the SCPs); and an even larger number of SSPs 2 assigned to service a smaller, very specific geographic area of the network.

Under the typical, prior art scenario, when a caller 8 subscribing to an AIN service places a call (or when a subscriber 9 to an AIN service is called), an SSP 2 identifies the call as one requiring AIN servicing based on some predetermined trigger criteria type (such as Termination Attempt, Off-Hook Delay), and subsequently develops a query event message, e.g., an SS7 message package containing a translation type number (TTN) and relevant call information. A TTN is a code, which identifies a classification of query to be routed to the SCP for processing the pending call. Currently, there are approximately twenty-seven different trigger criteria types that cause the SSPs to develop five different query classes. Each query event message contains only one trigger criteria type. The queries are formatted in accordance with the Transactional Capabilities Application Part (TCAP) protocol.

Under the conventional system, the SSP 2 transmits the query as an out-of-band signal to an STP 4. The STP then processes the query by translating the TTN and other information within the query into a SSN (subsystem number) and a specific SCP to which to route to. The translated query, including the translated SSN, is then forwarded to an SCP 6 appropriate for processing the call in question, which responds by calling the service logic routine(s) specified by the SSN. The service logic routines process the call pursuant to the services subscribed to by the involved subscribers.

While the above approach provides excellent subscriber services, it suffers from certain inefficiencies from the service provider's point of view. For example, since in order to process a query, an STP 4 must translate a TTN in the query into a SSN for use by the SCP 6, and since modifying or adding new services under the prior art approach often requires the addition of new TTNs and SSNs, modifying or adding new services typically requires updating the translations of all of the STPs 4 in the AIN. Since the STPs 4 are usually the second most numerous element in the AIN, this updating process is often time consuming and expensive.

By way of another example, under the prior art approach, the management software of the SCPs 6 is adapted to only call one service routine per query. In order to accommodate subscribers to multiple services, it is, therefore, necessary to write new combination service routines combining the multiple services subscribed to by the subscriber into a single logic routine. Since there are many different possible service combinations, the prior art approach requires the creation of many different combination service routines to enable the SCPs 6 to call any subscribed-to service combination as a single routine. Such an approach requires the expenditure of computer personnel time and efforts. This effort includes the creation of additional routines, allocation of additional TTNs, allocation of additional SSNs, as well as the updating of STPs 4 with translations of the new TTNs allocated for new service combinations. TTNs are a limited resource within the network. Each RBOC is allocated a range for which TTNs can be allocated locally, all others are allocated on a national level. It also taxes computer resources in that it requires the storage and processing of additional computer routines on both the SCPs 6 and the STPs 4.

In addition, prior art systems are also disadvantageous in that every SCP 6 is required to include multiple service package application programs. A service package application (SPA) is the software required to run or execute a service on an SCP 6. Prior art approaches provided one SPA for every service provisioned on an SCP 6. In other words, if an SCP 6 is programmed to provide twenty services, under the prior art approach it is necessary to load twenty separate SPAs onto the SCP 6; one SPA for each of the twenty services. Thus, under the prior art approach, every time a new service is added, a new SPA must be loaded onto the SCP 6. If multiple SCPs 6 are present, multiple copies of the SPAs must be loaded.

Not only does the presence of multiple SPAs on an SCP 6 deplete system resources, but requiring the addition of a new or modified SPA for ever new or modified service is also costly in terms of both personnel and computer time. More specifically, the source code of an SPA is typically written in service script logic (SSL) language. SSL is not directly usable by SCPs 6. Therefore, in order to provision an SCP 6 with a new or modified SPA, it is necessary to compile the SSL source code into object code and deliver the object code to the SCPs. Then a service package field update (SPFU) program is run to transfer the customer data from the existing SPA to the new SPA. Of course, a SPFU must be run for every SCP 6 in the AIN provisioned with the new or modified service.

Moreover, the service provisioning computers employed by Regional Bell Operating Companies (RBOCs) to modify subscription packages (e.g., by adding or deleting subscribers) on the AIN must also be provisioned with the multiple SPAs used in prior art systems. Like SCPs, the service provisioning computers cannot execute SPAs in their SSL language format. Instead, SPA object code must be delivered to the service provisioning computers and a service package version management (SPVM) program must be run to transfer customer data from an existing SPA to the new SPA. Thus, when a new or modified service is added to an AIN system, multiple SPFU and SPVM programs must be run to provision the new SPA at all required locations in the AIN system. This process utilizes a great deal of personnel time and ties up considerable resources. It also introduces undesirable delays into bringing new or modified services on-line in an AIN system.

Prior art AIN systems are also disadvantaged in the way they process errored calls. Specifically, in prior art systems, errored calls can only be handled in two ways. The caller and called parties 8, 9 can be connected without delivering the subscribed-to service, or the call can be terminated, often without making a connection. In either instance, the subscriber is not informed of the error. Instead, the subscriber is left to wonder why the AIN service was not provided or why the call was disconnected.

As mentioned above, prior art AIN systems offer many different services to subscribers. In exchange for payment of a fee (typically, on a monthly or per use basis), the subscribed-to service(s) are provided at any time of the day or night that the subscriber places (or, in some instances, receives) a call. Although some prior art AIN systems include billing programs which tabulate and charge subscribers per use fees for the subscribed-to services, prior art AIN systems do not monitor the number of accesses made to each available service on a global scale. In other words, prior art AIN systems do not calculate the number of accesses made to the various services by all subscribers combined and, thus, have no means of determining the popularity of the services to facilitate decision making such as discontinuance of services and/or enhancement of less popular services. In addition, since prior art systems employ multiple SPAs, in order to monitor service usage, they must provide monitoring functionality within each SPA for each service requiring monitoring.

BRIEF DESCRIPTION OF THE DRAWINGS

FIG. 6 is a simplified example of a subscription services list for an exemplary subscriber.

FIG. 7 is a simplified example of a mapped services list for one possible trigger criteria type.

FIG. 8 is an example of an active services list for the examples of FIGS. 6 and 7.

FIG. 11 is an illustration of one possible implementation of an NPA_NPANXX_Names Table employed by the service activation manager of FIG. 5.

FIG. 12 is an illustration of one possible implementation of the user data table employed by the service activation manager of FIG. 5.

FIG. 13 is an illustration of a first hexadecimal bit map employed to identify subscribed-to services specified in the user data table of FIG. 12.

FIG. 14 is an illustration of a second hexadecimal bit map employed to identify subscribed to services specified in the user data table of FIG. 12.

FIG. 15 is an illustration of a third hexadecimal bit map employed to identify subscribed to services specified in the user data table of FIG. 12.

FIG. 16 is an illustration of one possible implementation of a trigger table employed by the service activation manager of FIG. 5.

FIG. 17 is an illustration of one possible implementation of a service specification table employed by the service activation manager of FIG. 5.

DESCRIPTION OF THE PREFERRED EMBODIMENTS

Figure 1:
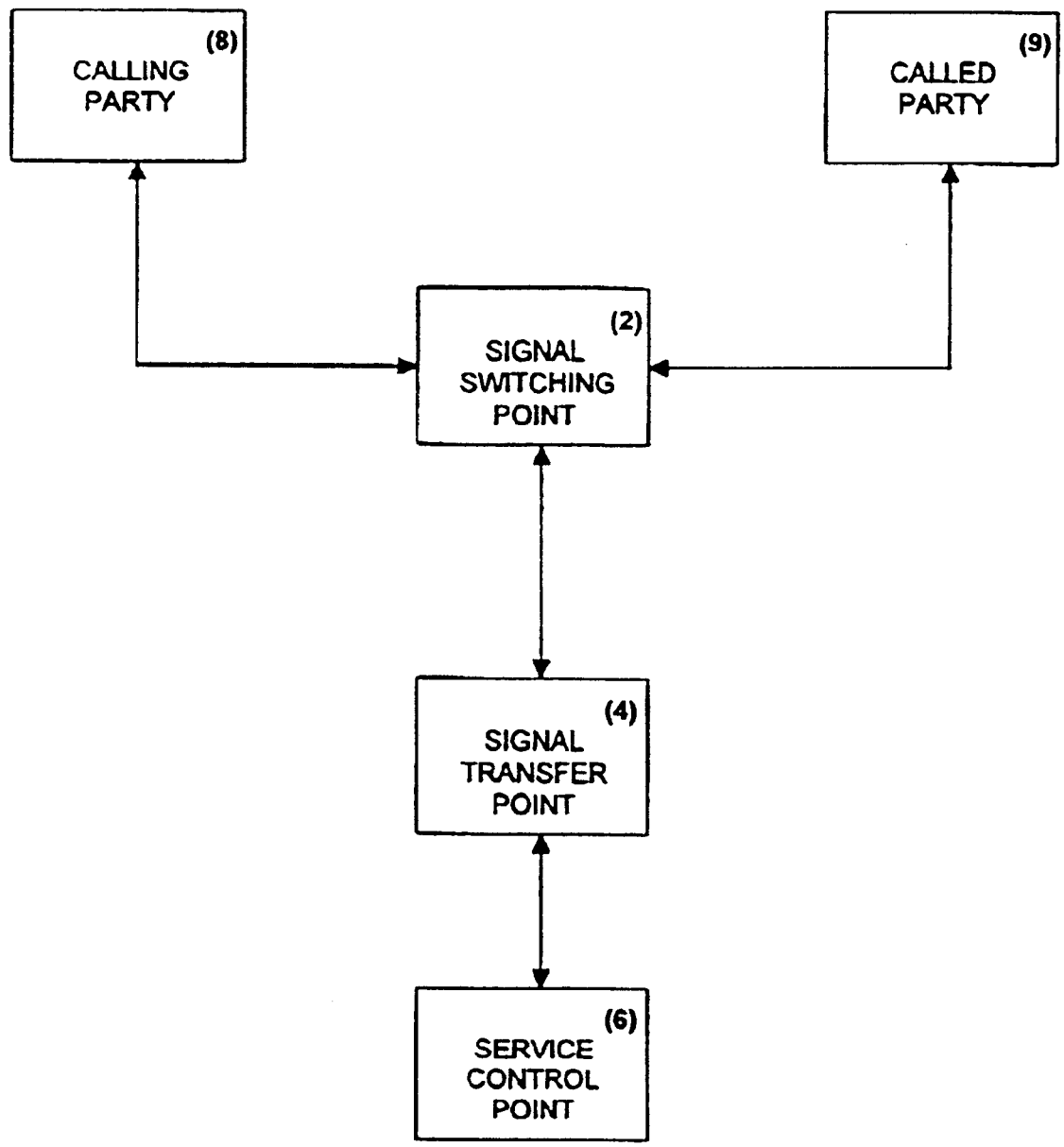
FIG. 1 is a schematic illustration of a portion of a representative advanced intelligent network.
Figure 2:
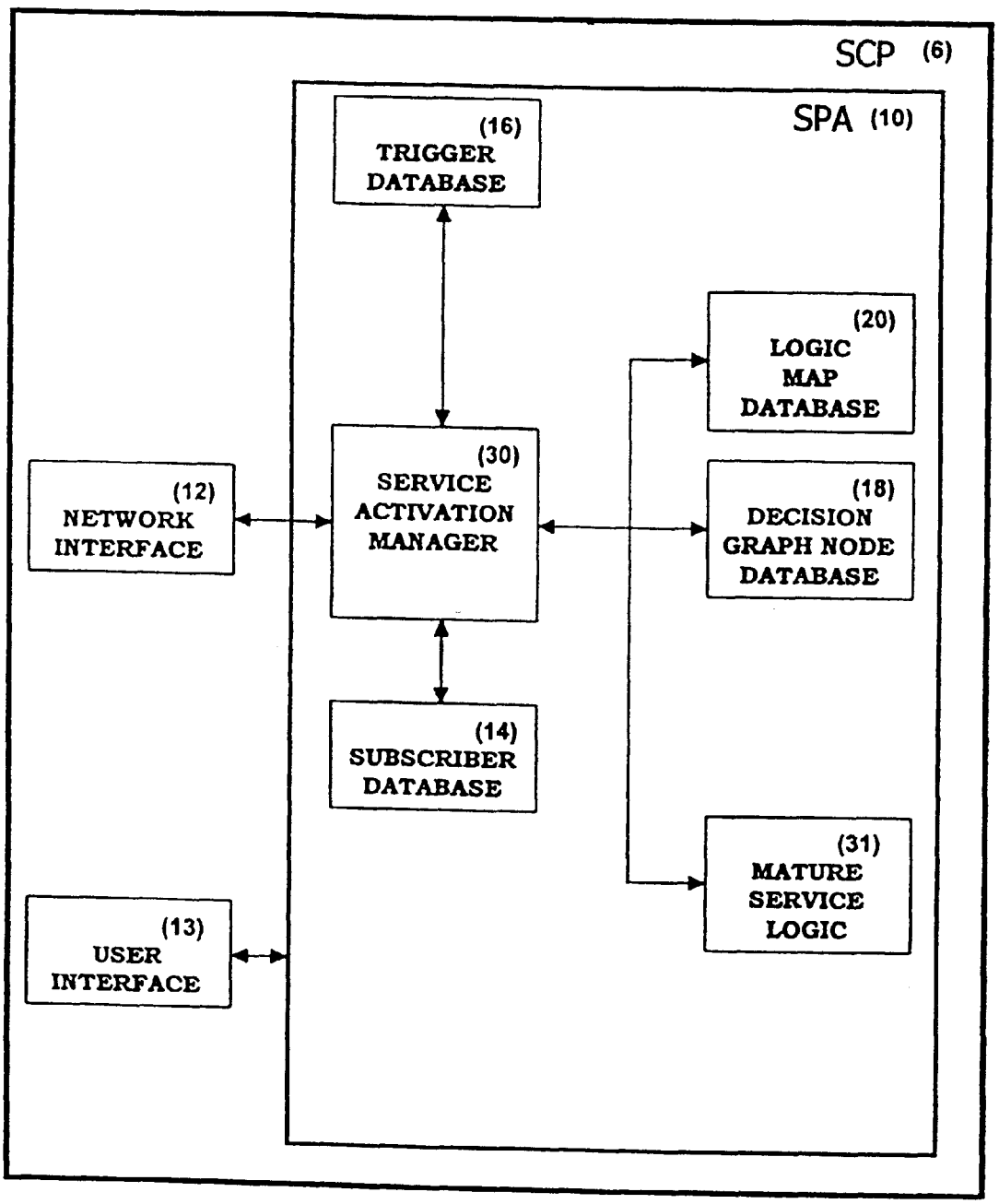
FIG. 2 is a schematic illustration of a service control point employing a service package application constructed in accordance with the teachings of the invention.

A service package application (SPA) 10 constructed in accordance with the teachings of the invention is schematically illustrated in FIG. 2. To facilitate an understanding of the operation and structure of the SPA 10, the SPA 10 is illustrated as having been loaded on an SCP 6 including a Network interface 12, and a User Interface 13. The Network interface 12 couples the SCP 6 to the advanced intelligent network and provides a mechanism for receiving and replying to various query event messages from the AIN. The User Interface 13 provides the mechanism to update the various Databases within the SPA (10) As explained further below, the subscriber database 14 contains a list of subscribers serviced by the SCP 6 and an identification of the phone call services to which the listed subscribers subscribe. As also explained in further detail below, the trigger database 16 contains a map mapping trigger criteria types associated with query event messages to phone call services. Preferably, the trigger database 16 maps the universe of possible trigger criteria types received in the AIN queries to the universe of possible phone call services delivered by the SCP 6.

Unlike prior art service package applications, the SPA 10 provides multiple services to subscribers. In other words, whereas prior art service package applications were related to phone call services on a one to one basis (i.e., one SPA for every service or service combination), the SPA 10 is related to the phone call services provided by the SCP 6 on a one to many basis. All services provided by the SCP 6 are implemented through the SPA 10, and the SPA 10 is preferably the only service package application resident on the SCP 6. Thus, all phone calls serviced by the SCP 6 are processed by the SPA 10.

In one respect, the SPA 10 achieves this one to many relationship by dividing all of the services provided by the SCP 6 into a plurality of separate software routines called decision graph nodes (DGNs) or service independent building blocks (SIBs). The decision graph nodes collectively provide all of the functionality required to perform any and all of the services associated with the SCP 6. Each decision graph node is a software routine for performing at least one predefined function. For example, the SPA 10 includes a decision graph node for Pop_Route which populates basic routing information for a return response. Each service associated with the SCP 6 is provided by executing one or more of the decision graph nodes in a predefined, logical order specified by a logic map (or decision graph) which is preferably stored separately from the decision graph nodes providing the service functionality.

Advantageously, two or more different services can utilize the same decision graph node. Not only does this software routine sharing preserve system resources by reducing the amount of duplicate software code stored on the SCP 6, but it enables new or modified services combining existing decision graph nodes in new ways to be added to the SPA 10 and the SCP 6 without requiring the performance of a service package field update (SPFU) or a service package version management (SPVM) update. This ability to add new or modified services without running SPFU or SPVM routines greatly reduces the costs and delays associated with offering new or modified services on the AIN. Of course, if a new or modified service requires new functionality which is not provided by one or more of the existing decision graph nodes, (i.e., if one or more new decision graph nodes must be added to the SPA 10 to implement the new or modified services), the conventional SPFU and SPVM routines must be performed.

For the purpose of storing the decision graph nodes required to execute the services provided by the SCP 6 in a retrievable manner, the SPA 10 includes a decision graph node database 18. Preferably, each of the decision graph nodes are stored in the decision graph node database 18 in an individually addressable, random access fashion such that they can be retrieved and executed in any order. In the preferred embodiment, the decision graph node database 18 is implemented within the context of the SPA 10 loaded on the SCP 6.

In order to store the logic maps required to execute the services provided by the SCP 6, the service package application 10 is provided with a logic map database 20. Preferably, the logic map database 20 stores each of the logic maps required by the SCP 5 in an individually addressable, random access fashion such that they can be independently retrieved and utilized. Each of the logic maps stored in the logic map database 20 identifies a logically ordered combination of one or more of the decision graph nodes stored in the decision graph node database 18. By executing at least a subset of the decision graph node(s) specified in a logic map in the order specified in that logic map, the SPA 10 delivers the phone call service associated with that logic map. In other words, each of the logic maps defines a, preferably unique, manner of processing phone calls.

Figure 3:
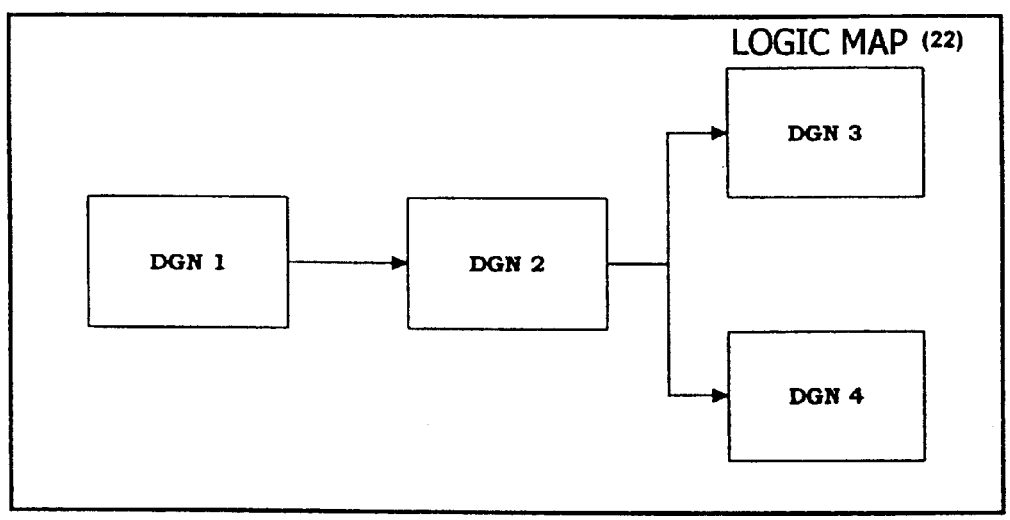
FIG. 3 is a schematic illustration of a first exemplary logic map for implementing a phone call service with the service package application of FIG. 2.
Figure 4:
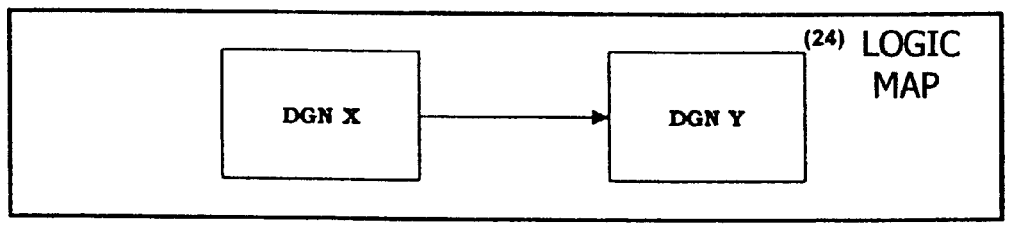
FIG. 4 is a schematic illustration of a second exemplary logic map for implementing a phone call service with the service package application of FIG. 2.

Representative logic maps 22, 24 are schematically illustrated in FIGS. 3 and 4. As shown in those figures, logic map 22 specifies a phone call service which is performed by executing decision graph node 1, decision graph node 2, and either decision graph node 3 or decision graph node 4 in the predefined order represented by the connectors shown in FIG. 3 (i.e., by executing decision graph node 1 before decision graph node 2, and by executing decision graph node 2 before either decision graph node 3 or decision graph node 4, whichever is specified by a logic operation associated with decision graph node 2). Logic map 24, on the other hand, defines a phone call service which processes calls by executing decision graph node X and decision graph node Y in the order indicated by the connector shown in FIG. 4 (i.e., by executing decision graph node X before decision graph node Y). Preferably, executing the decision graph nodes specified in logic map 22 in the order specified in map 22 processes a phone call differently than executing the decision graph nodes specified in logic map 24 in the order specified in map 24. Thus, the phone call service delivered by logic map 22 is preferably different than the phone call service delivered by map 24.

The decision graph nodes specified in a first logic map may be mutually exclusive of the decision graph nodes listed in a second logic map. However, this need not be the case. Decision graph nodes can be identified in more than one logic map. For example, in the examples shown in FIGS. 3 and 4, the decision graph nodes DGN1, DGN2, DGN3 and DGN4 of logic map 3 can be mutually exclusive of the decision graph nodes DGNX, DGNY of map 24, or, one or more of the decision graph nodes DGN1, DGN2, DGN3, DGN4 of map 22 can be the same as one or more of the decision graph nodes DGNX, DGNY of map 24 (e.g., DGNX=DGN2 and/or DGNY=DGN4). Of course, it is possible for two logic maps to share the same decision graph nodes and still deliver different services if those decision graph nodes are logically connected differently in each of the two maps.

Returning to FIG. 2, for the purposes of executing the decision graph nodes in the order specified in the logic maps stored in the logic map database 20, the SPA 10 is provided with a service activation manager (SAM) 30. As shown in FIG. 2, the service activation manager 30 is in communication with both the logic map database 20 and the decision graph node database 18. As a result, the SAM 30 can individually retrieve the logic maps and execute the decision graph nodes they specify to deliver services to subscribers. More specifically, when a phone call requiring processing in accordance with an AIN phone call service is received by the SAM 30 from the Network interface 12, the SAM 30 responds by retrieving the logic map associated with the service to be provided by the SCP 6 from the logic map database 20 (e.g., logic map 22 or logic map 24). The SAM 30 then retrieves and executes the decision graph nodes identified in the retrieved logic map in the order specified in that map. The decision graph nodes will perform their associated functions (in some instances, by processing or converting data associated with the serviced phone call, for example, by directing the call to a different phone number that was dialed) and the call will be processed in the manner specified by the retrieved logic map. If a second call requiring processing in accordance with a different AIN service is received by the SAM 30, the SAM 30 retrieves the required logic map (e.g., map 22 or map 24) and subsequently retrieves and executes the decision graph nodes identified in the newly retrieved logic map. In short, the SAM 30 responds to phone calls requiring processing in accordance with a phone call service by retrieving a logic map associated with the service from the logic map database 20, and by sequentially executing the decision graph nodes in the order specified in the retrieved logic map.

As services become mature and modifications are no longer required, the service execution efficiency can be improved by using the developed service logic map as a basis to write the service directly in SLL. This of course is equivalent to developing a new decision graph node and would require a SPFU/SPVM to implement. The advantage to this method is it improves the efficiency of the system while still retaining the flexibility to make decision graph changes if the need arises in the future. As shown in FIG. 2, the SPA 10 is provided with a mature service logic database 31 which stores mature services written in SLL. As also shown in FIG. 2, the SAM 30 is in communication with the mature service logic database 31.

Figure 5:
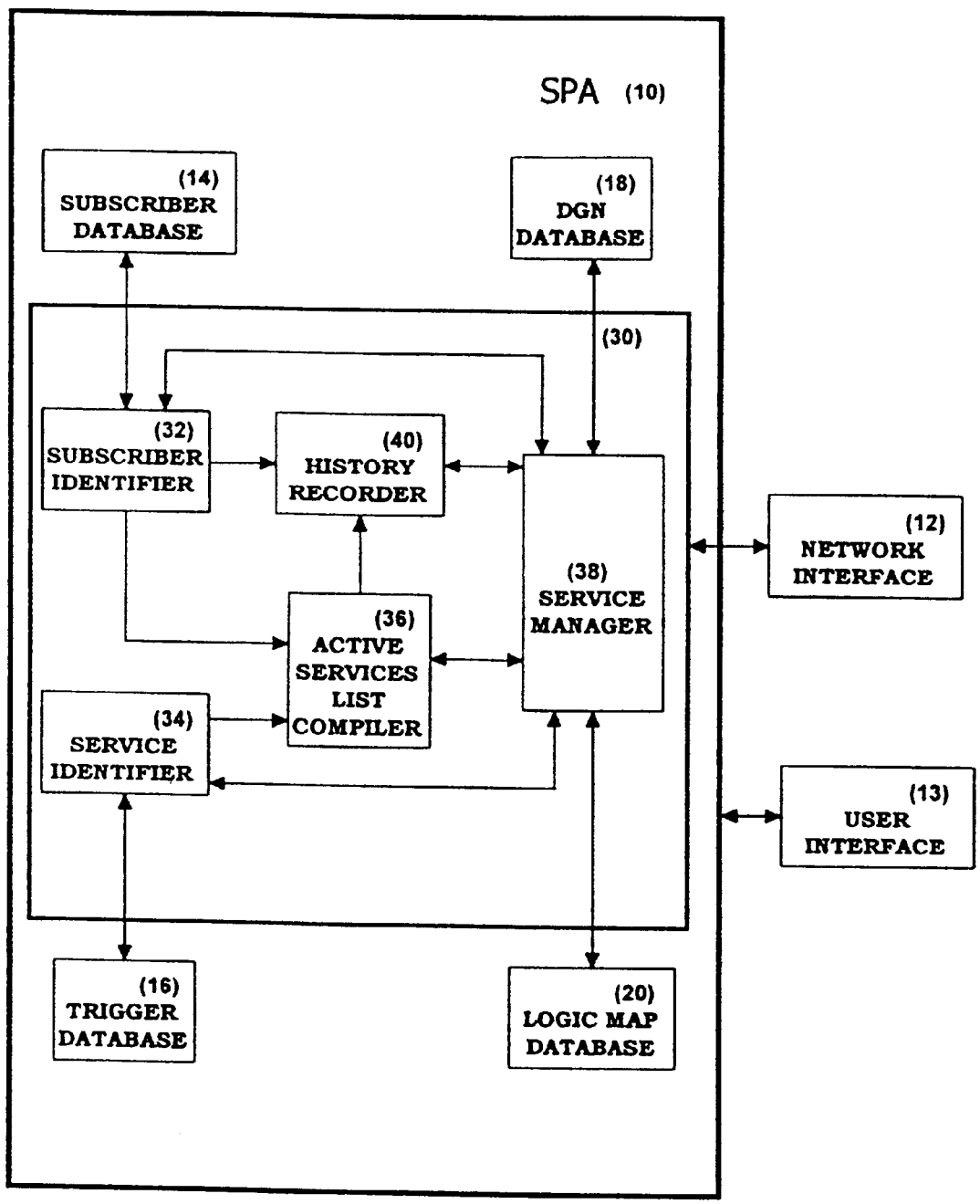
FIG. 5 is a schematic illustration of a service activation manager constructed in accordance with the teachings of the invention and shown in an environment of use.

A more detailed schematic illustration of the service activation manager 30 is shown in FIG. 5. For the purpose of identifying subscribers and the services to which they subscribe, the SAM 30 is provided with a subscriber identifier 32. The subscriber identifier 32 is in communication with the subscriber database 14 which, as explained in further detail below, includes an identification of the services subscribed to by each subscriber serviced by the SCP 6. When the SAM 30 receives a query event message from the Network interface 12 indicating that a phone call requires AIN processing, the subscriber identifier 32 identifies a subscriber associated with the call (typically, the calling or called party). The subscriber identifier 32 preferably identifies the subscriber by retrieving a phone number associated with the subscriber from the query event message and by polling the subscriber database 14 to ensure the subscriber is, in fact, known to the SCP 6. The subscriber identifier 32 then cooperates with the subscriber database 14 to retrieve a subscription services list of phone call services subscribed to by the identified user. This subscription services list is stored in a temporary memory associated with the SCP 6 for later use.

For example, if the query event message indicates that a user having the phone number (555) 123-4567 has placed a phone call, and if the subscriber database 16 indicates that the user with the phone number (555) 123-4567 subscribes to the services FES, ACC and Service Z, the subscriber identifier will write representations of the services FES, ACC and Service Z in the subscription services list. A representative subscription services list of this example is shown in FIG. 6.

In order to identify the phone call services associated with the received query event message, the SAM 30 is further provided with a service identifier 34. As shown in FIG. 5, the service identifier 34 is in communication with the trigger database 16. As explained in further detail below, the trigger database 16 includes a list mapping the universe of possible trigger event criteria to phone call services. As also explained further below, while each query event message is only associated with one trigger criteria type, multiple phone call services are typically mapped to each trigger criteria type. The service identifier 34 determines which of the possible trigger criteria types is associated with the received query event message and uses the determined trigger criteria type to access the trigger database 16 to identify the phone call services mapped to the determined trigger criteria type (and, thus, to the received query event message). The service identifier 34 writes the identities of the phone call services specified in the trigger database 14 as being associated with the trigger criteria type of the phone call in question in a mapped services list. The mapped services list, like the subscription services list, is stored in the temporary memory associated with the SCP 6 for later use.

For example, if the service identifier 34 determines that trigger criteria type 300 is associated with the phone call being processed, the service identifier could write representations of: (a) the Default service for trigger criteria type 300, (b) a service X, (c) the service FES, and (d) the service N to the mapped service list. The mapped service list associated with this example is shown in FIG. 7.

For the purpose of determining which of the services identified by the subscriber identifier 32 and the service identifier 34 should be executed in response to the received query event message, the SAM 30 is provided with an active services list compiler 36. The active services list compiler 36 cooperates with the subscriber identifier 32 and the service identifier 34 to develop an active services list by comparing the subscription services list and the mapped services list stored in the temporary memory. The active services list compiler writes representations of the services appearing in both the subscription services list and the mapped services list in an active services list. It then stores the active services list in the temporary memory of the SCP 6.

For example, if the subscriber identifier 32 has developed the subscription services list shown in FIG. 6 and the service identifier 34 has developed the mapped services list shown in FIG. 7, the active services list compiler 36 will write the services FES and service N to the active services list. The active services list for this example is shown in FIG. 8.

For the purpose of sequentially executing the phone call services identified in the active services list, the SAM 30 is provided with a service manager 38. As shown in FIG. 5, the service manager 38 receives the active services list from the active services list compiler 36 (either directly or by retrieving it from the temporary memory). The service manager 38 then executes the services listed in the active services list preferably in the order specified in that list. To this end, the service manager 38 is in communication with the logic map database 20 and the decision graph node database 18.

To execute the services identified in the active services list, the service manager 38 retrieves the logic map associated with the first service in the active services list from the logic map database 20. It then retrieves the decision graph nodes contained in the retrieved logic map from the decision graph node database 18 and executes them in the order specified by the retrieved logic map. Unless the first performed service is defined to provide an immediate response to the AIN, and unless there is only one service in the active services list, the service manager 38 will then retrieve the logic map associated with the second service identified in the active services list and execute the logically ordered combinations of decision graph nodes specified in the second retrieved logic map to perform the second service. The service manager 38 continues executing the services identified in the active services list by retrieving the appropriate logic maps and executing the specified decision graph nodes until either a service is performed that requires immediate response to the AIN, or all of the services in the active services list have been performed. When either of these events occurs, the service manager 38 outputs a response containing the data it developed by performing the service(s) to the AIN via the Network interface 12 of the SCP 6.

As shown in FIG. 5, the SAM 30 is preferably provided with a history recorder 40. The history recorder 40 cooperates with the active services list compiler 36 to develop a record of the number of times each of the phone call services provided by the SCP 6 is delivered to the universe of subscribers to provide usage data. The history recorder 40, thus, provides a mechanism to measure the popularity of the services offered by the telecommunications company operating the SCP 6. Preferably, the history recorder 40 stores data concerning the times and dates of execution for each executed service such that further usage information is developed.

As is well known, recent legislation has required the Regional Bell Operating Companies (RBOCs) to "unbundle" their services. Specifically, this legislation has required the RBOCs to permit competitors to sell services to subscribers using the RBOC's facilities. As explained in further detail below, the history recorder 40 provides a mechanism for tracking usage by the customers of these competitive local exchange carriers (CLECs) and, thus, for properly billing these services. Specifically, the history recorder 40 cooperates with the subscriber identifier 32 and the active services list compiler 36 to record the number of times each service was delivered by the SCP 6 to customers of the CLECs using the RBOC's SCP 6. Preferably, the history recorder 40 stores detailed information identifying the time and date of the service delivery, the identity of the delivered service, the identity of the CLEC of the subscriber receiving the service, and the number of times the service was delivered within a 30 minute period. Preferably, all of this information is stored by the history recorder 40 in association with a stored representation of the local exchange carrier credited with delivering the service such that a report can be easily developed and delivered to the appropriate CLEC showing the total usage of the CLEC's customers in a predefined time period. To this end, the subscriber database 14 preferably includes an identification of the local exchange carrier contracting with each subscriber. Of course, the history recorder 40 will also preferably store the usage information for the customers of the entity owning the SCP 6 as well as for its competing CLECs. The stored information can thus be used to develop invoices requesting payment on a periodic basis and to properly credit received payments to the local exchange carrier under contract with the paying subscribers.

Figure 9:
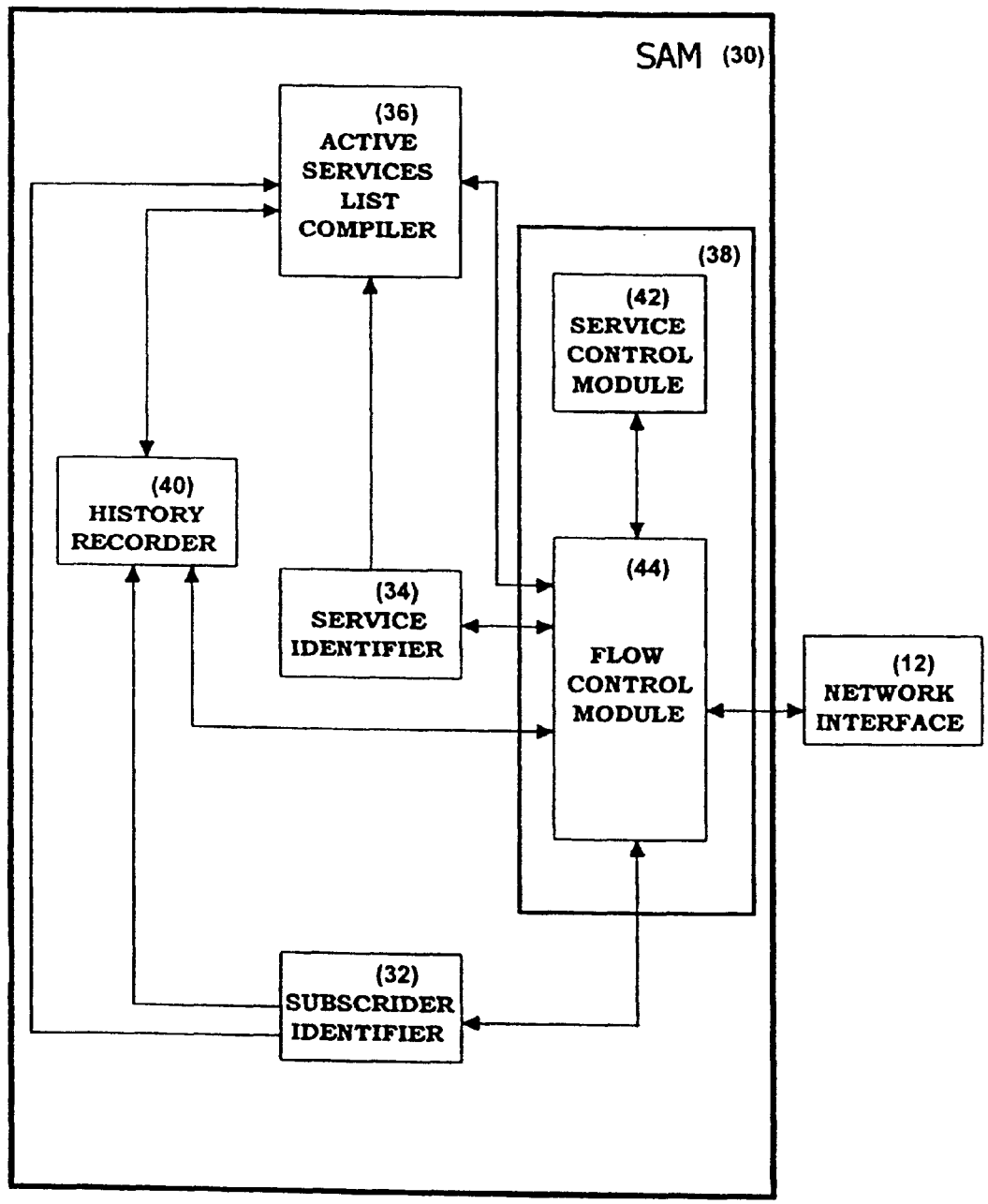
FIG. 9 is a more detailed schematic illustration of the service activation manager of FIG. 5.

A more detailed illustration of the SAM 30 is shown in FIG. 9. As shown in that figure, in the preferred embodiment, the service manager 38 preferably comprises a service control module 42 and a flow control module 44. The service control module 42 preferably communicates with the logic map database 20 and the decision graph node database 18 to retrieve and execute decision graph nodes in the logical order specified in the logic maps. The flow control module 44 preferably acts as a centralized control module that communicates with the various components of the SAM 30 to request those components to perform their functions as needed. In short, the flow control module 44 preferably receives inputs from the Network interface 12 and manages the components of the SAM 30 to respond to the inputs in an appropriate fashion.

Persons of ordinary skill in the art will appreciate that, although the various components of the SAM 30 discussed above (e.g., the subscriber identifier 32, the service identifier 34, the active service list compiler 36, the service manager 38, the history recorder 40, the service control module 42, and/or the flow control module 44) could be implemented in whole or in part as hardware or firmware, in the preferred embodiment each of those components is implemented by software running on the central processor of the SCP 6.

Figure 10A:
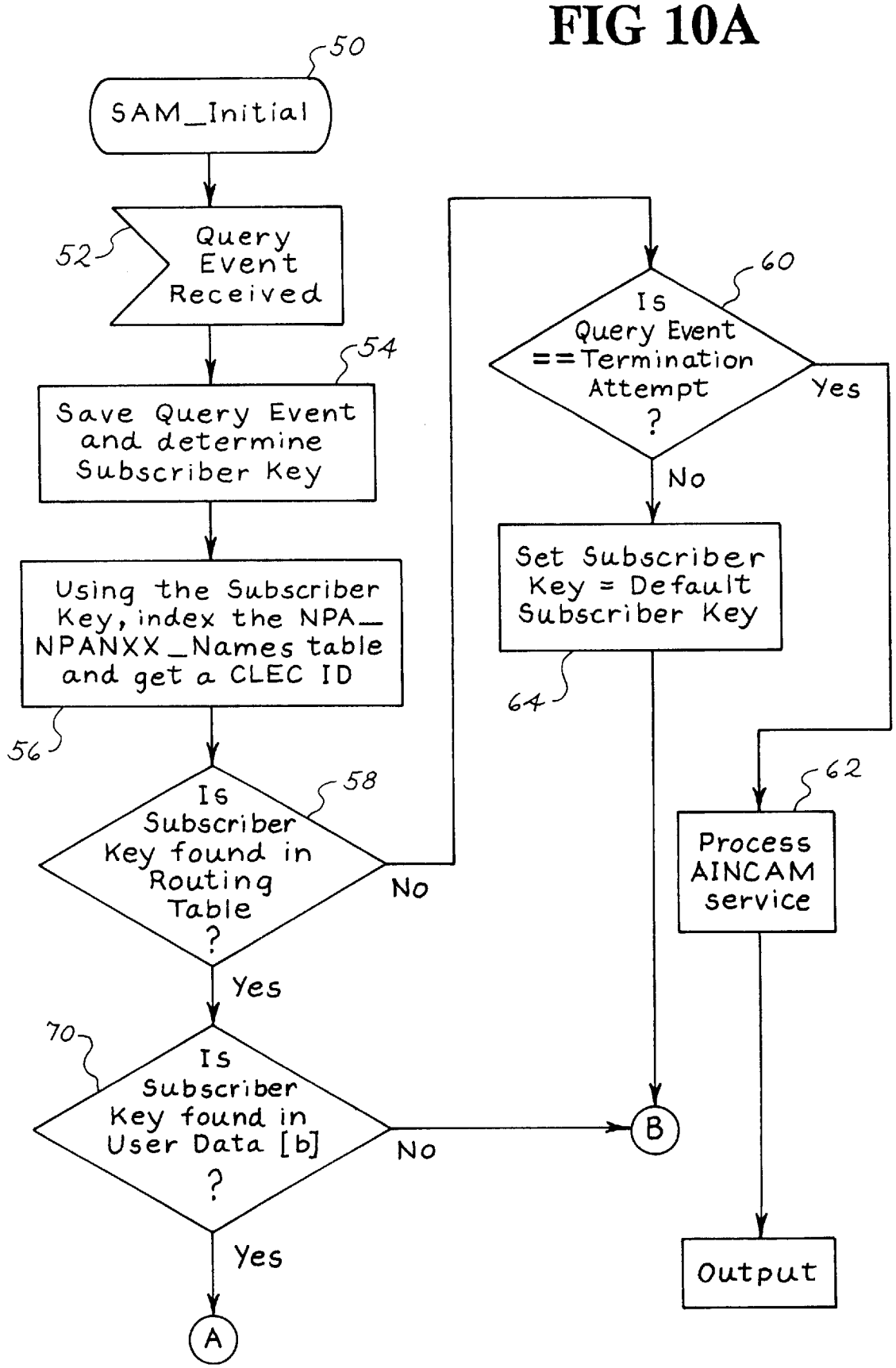
FIGS. 10A–10C are flow charts illustrating a preferred program implementing the service activation manager of FIG. 5.
Figure 10B:
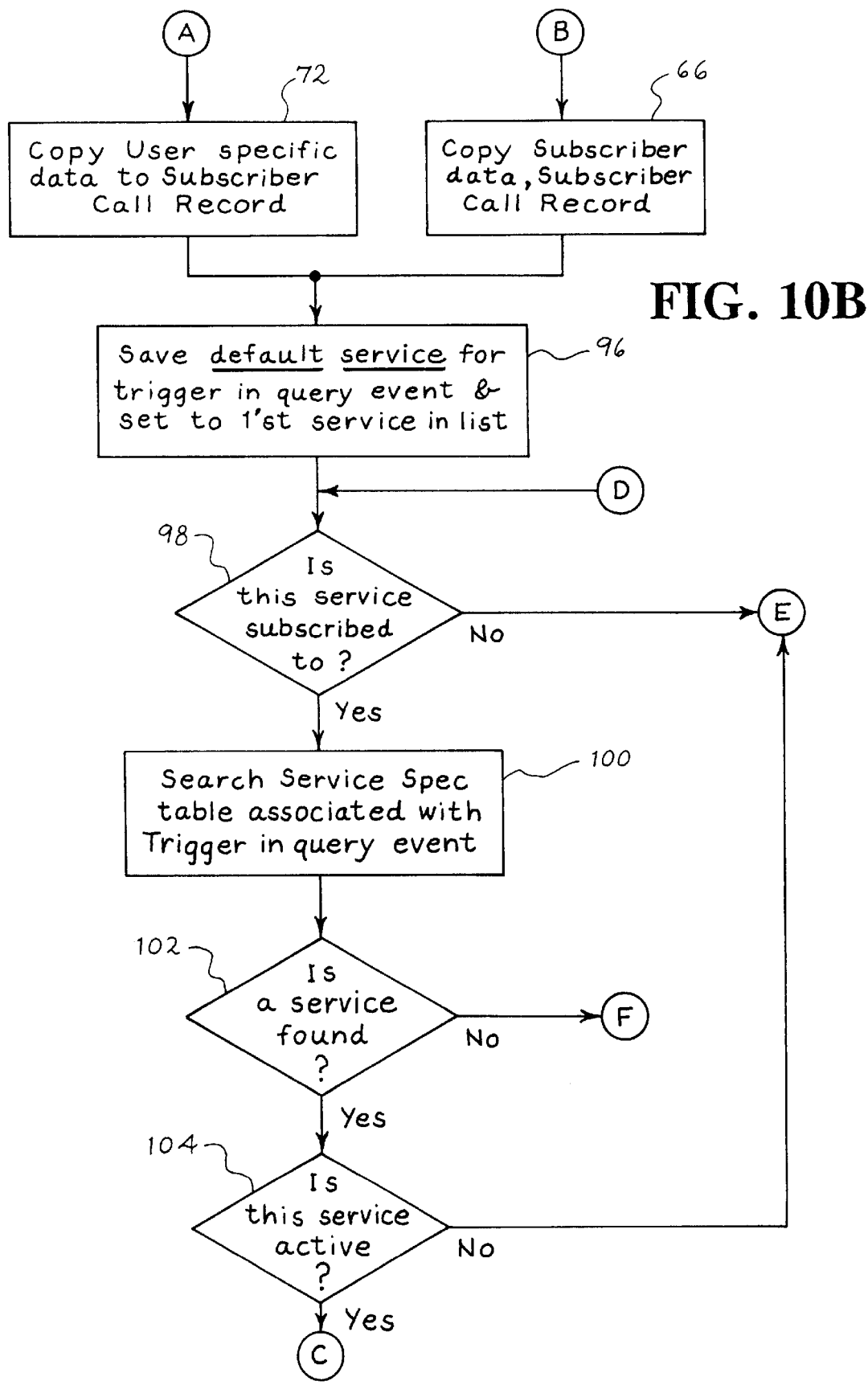
Figure 10C:
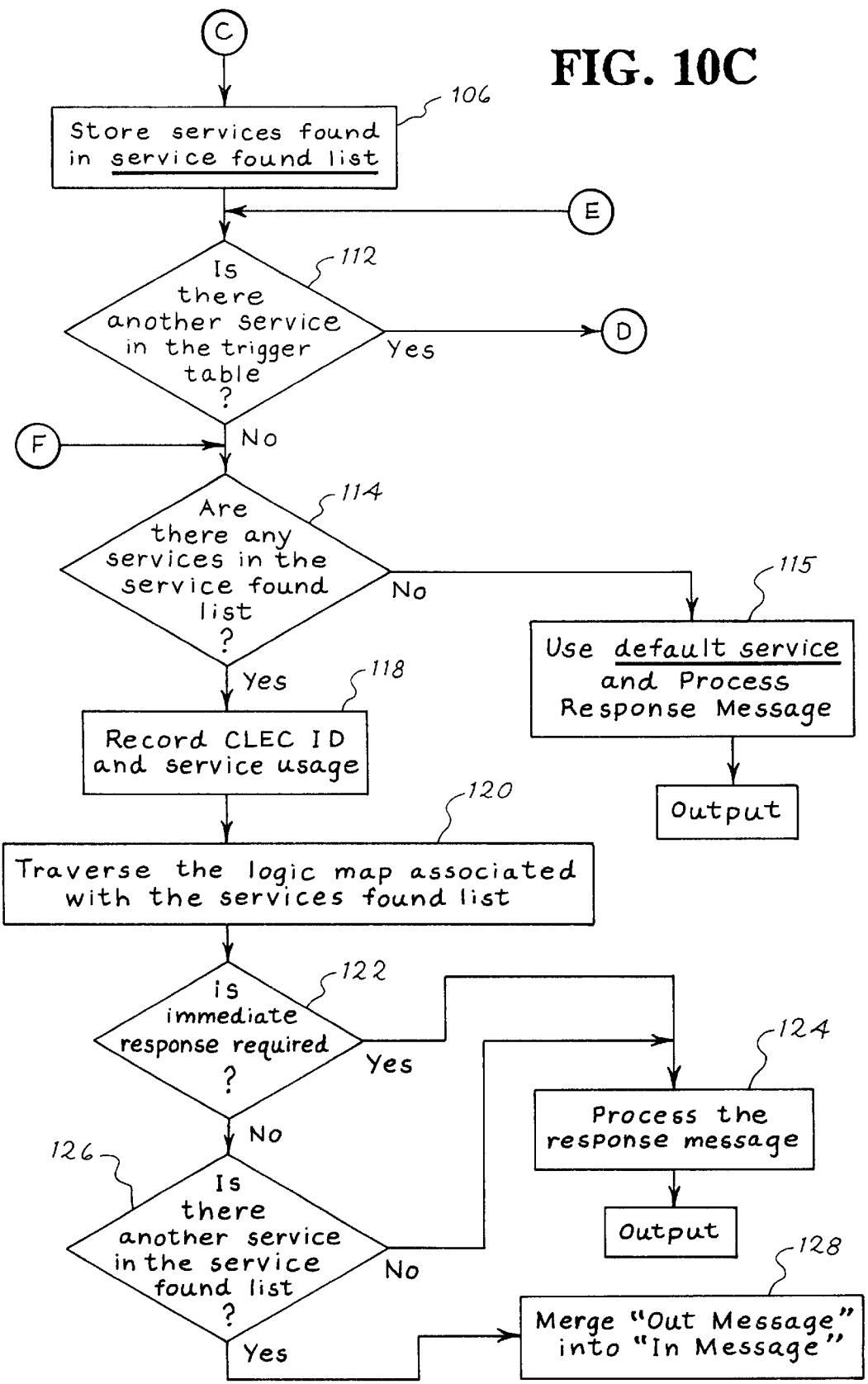

A more detailed explanation of the preferred embodiment of the structure and operation of the software comprising the SAM 30 will now be provided in connection with the flow charts appearing in FIGS. 10A–10C. As shown in FIG. 10A, when the SAM 30 is first booted up, it performs various conventional housekeeping tasks such as status and counter initialization (block 50). It then enters a wait mode where it awaits the receipt of a query event message from the AIN. When the flow control module 44 of the SAM 30 receives a query event message (block 52) via the Network interface 12, it stores the query event message in a temporary memory. The subscriber identifier 32 then identifies a subscriber key (i.e., the subscriber's phone number) from the query event message based on query class and trigger criteria type (block 54).

The subscriber identifier 32 uses the subscriber's phone number to index an NPA_NPANXX_Names table stored in the subscriber database 14. A representative NPA_NPANXX_Names table is shown in FIG. 11. The NPA_NPANXX_Names table maps local exchange carriers to subscriber phone numbers. As shown in FIG. 11, in some cases an entire block of phone numbers is assigned to a specific carrier. For instance, in the example shown in FIG. 11, all of the numbers having the area code "555" and the prefix "111" are assigned to the competitive local exchange carrier identified as "CLEC.1"; the block of phone numbers beginning with the numbers "555.123.45" are assigned to carrier "CLEC.2"; and the block of phone numbers beginning with the numbers "555.312.5" are assigned to carrier "CLEC.2". Individual phone numbers can also be under contract with specific telecommunications companies. For instance, in the example shown in FIG. 11, the user having phone number 555.312.6543 is under contract with the RBOC owning the SCP 6.

The subscriber identifier 32 looks up the subscriber's phone number in the NPA_NPANXX_Table and identifies the local exchange carrier under contract with the subject subscriber. For purposes of explanation, assume the subscriber has phone number 555.123.4540. Upon accessing the table shown in FIG. 11, the subscriber identifier determines that this subscriber is under contract with the competitor local exchange carrier "CLEC.2". This information is stored in the temporary memory of the SCP 6 (block 56) in a temporary subscriber record file.

At block 58, the subscriber identifier 32 accesses a routing table stored in the subscriber database 14 to determine if the subscriber is identified in that table. The routing table, which is typically provided by the vendor of the SCP 6 running the SAM 30, is a list of ten digit phone numbers serviced by the SCP 6 in question. If the subscriber's telephone number is not contained in the routing table, the subscriber identifier 32 notifies the flow control module 44.

At block 60, the flow control module 44 determines if the query event message was triggered by the called party (i.e., was triggered by a termination attempt). By way of explanation, caller identification (wherein the identity of the calling party is provided to the subscribing called party before connecting the phone call) is an extremely popular service at present. It also happens to presently be the only service which is triggered by a termination attempt (i.e., by attempting to call a subscriber) which most customers would have subscribed to. The SAM 30 takes advantage of these circumstances by omitting subscribers who subscribe only to the caller identification service to the routing table. Thus, if a query event message triggered by a termination attempt is received by the SCP 6 (block 60), and if the subscriber phone number is not in the routing table (block 58), the SAM 30 assumes that the call requires servicing in accordance with the caller identification process. Therefore, the flow control module 44 requests the service control module 42 to execute the caller identification service. The service control module 42 executes the caller identification service (AINCNAM) (block 62) as explained above. For efficiency, the AINCNAM service has been developed directly in SLL (i.e. a mature service).

Assuming for the moment that the flow control module 44 determines that the query event message was not triggered by a termination attempt (i.e., was not triggered by the service package of the called party), the subscriber identifier 32 sets the subscriber key (i.e., the subscriber phone number) to a default number (e.g., 999.999.9999) (block 64) and accesses a subscription associated with the default number, as any subscription would. The subscribers data of this default number is then copied to the subscribers call record (block 66). As explained in further detail below, this default number stored in the subscriber record is later used to ensure errored calls are processed in predefined manners.

Returning to FIG. 10A and assuming that the subscriber's phone number was found by the subscriber identifier 32 in the routing table (block 58), control proceeds to block 70. At block 70, the subscriber identifier 32 makes a determination as to whether or not the individual phone number is part of a larger subscription by searching the user data table. If the subscriber's phone number is not present in the user data table, this serves as an indication that a single number subscription is being accessed and the subscriber's data is copied to the subscriber's call record (block 66).

If, at block 70, the subscriber identifier 32 locates the subscriber's number in the user data table, control proceeds to block 72 (FIG. 10B) wherein the services subscribed to by the subscriber are copied from the user data table into the subscription services list associated with the subscriber record mentioned above. For example, if the user has subscribed to the services FES, ACC and Service N, those services will be written in the subscription services list shown in FIG. 6.

A representative example of the user data table is shown in FIG. 12. As shown in that figure, the user data table preferably includes five fields, namely, a subscription field 76, a range of subscriptions field 78, a main subscription number field 80, a service map table field 82, and a Group Identification Value (GID) field 84. The data in the five fields contained in any row of the table all relate to a subscription service package for a user or a group of users. The subscription field 76 is used to store a single phone number associated with the subscription services identified in the subject row of the user data table for the main subscription number. The range of subscription field 78 is used to store a range of phone numbers associated with the subscriber identified in the subscription field 76 for the main subscription number. For example, in FIG. 12, the subscribers at phone number (555) 123-4567 through (555) 123-4632 and the subscriber at phone number (555) 123-4633 are all associated with the same subscription identified by the phone number (555) 123-4567. Typically, the subscriber at (555) 123-4567 will be a business that has purchased services for a block of numbers.

The Main Number field 80 identifies the subscriber for the subscription package identified in a given row of the user data table by phone number. The main number field 80 and the subscription field 76 will often contain the same information. However, this will not always be the case. For example, in instances where a subscriber having a block of numbers permits different numbers in the block to subscribe to different services the number in the subscription field 76 will differ from the number in the main number field 80. For example, in FIG. 12, the subscriber (555) 123-4633 corresponds to an extension in a business whose main number (e.g., billing number) is (555) 123-4567. Thus, the subscription field 76 is different from the main number field 80 for subscriber (555) 123-4633. It should be noted that, in the instant example, subscriber (555) 123-4633 is listed separately from the block of numbers (555) 123-4567 through (555) 123-4632 because, as indicated in field 82, subscriber (555) 123-4633 subscribes to a different set of services (in this example, only one service) than do the other subscribers in the block of phone numbers associated with the billing number (555) 123-4567.

In the preferred embodiment, the subscribers identified in the range of subscribers field 78 are not individually listed in the subscription field 76. Grouping subscriptions in this manner is advantageous in that it reduces the time required to search the user data table and, thus, increases the response time of the SCP 6. It is also advantageous in that it reduces the size of the user data table and alleviates the need to store the same information in multiple places.

The map table field 82 contains a representation of the services subscribed to by the subscribers identified in fields 76 and 78 of the associated row in the user data table. In the preferred embodiment, the map field 82 of the user data table identifies the subscribed to services as a series of hexadecimal characters, wherein each hexadecimal character represents the subscription status of four predefined phone call services. More specifically, the map field 82 comprises a hexadecimal bit map field which preferably contains three strings of eight hexadecimal characters. Each of the three strings is mapped to one of three predefined bit mapped service tables.

A representative example of the first one of the three bit mapped service tables identified in the first map field 82 of the user data table is illustrated in FIG. 13. Each of the bit mapped service tables has a service identification field 86 including a plurality of unique positions. Preferably, there are thirty-two such positions (numbered 0 to 31) in the service identification field 86 of the bit mapped service table, as shown in FIG. 13. Each of the positions (0–31 in FIG. 13) is associated with one of the plurality of services provided by the SCP 6.

Each of the three bit mapped service tables also includes a user identification bit field 88 having a plurality of unique bit positions. Each of the bit positions in the user identification bit field 88 is associated with a corresponding one of the positions in the service identification field 86. The subscription status of each service identified in the service identification field 86 is indicated by placing a bit having a predefined bit state (e.g., 0 or, preferably, 1) in the corresponding bit position of the user identification field 88. For example, if a subscriber subscribes to a phone call service represented by position 3 in the service identification field 86 of the first bit mapped service table, in the preferred embodiment a "1" would be stored in the corresponding bit position of the user identification bit field 88 (i.e., in the fourth position counting bottom to top in FIG. 13). If the service associated with position 3 of the service identification field 86 of the first bit mapped service table is not subscribed to (or if the subscription to that service is canceled), a "0" is stored in the corresponding bit position of the user identification bit field 86 of the subject bit mapped service table.

In order to represent the data contained in the three bit mapped service tables in a compact form in the user data table, the bit states of the bits in the bit positions in the user identification fields 88 of the tables are represented in a hexadecimal format. In particular, the bit positions in the user identification field 88 are grouped into groups of four positions. For example, the positions corresponding to positions 0–3 in the service identification field 86 comprise a first group of four bit positions, the bit positions corresponding to the positions numbered 4–7 in the service identification field 86 comprise a second group of four bits, etc. The bit states of the bits in each group of four bit positions are then represented as a hexadecimal character. For example, in FIG. 13, the bits in the first group are represented by the hexadecimal character "F", the second group is represented by the hexadecimal character "2", the third group is represented by the hexadecimal character "4", the fourth group is represented by the hexadecimal character "0", the fifth group is represented by the hexadecimal character "E", the sixth group is represented by the hexadecimal character "8", the seventh group is represented by the hexadecimal character "B", and the eighth group is represented by the hexadecimal character "0". As a result, the subscription status of the thirty-two services associated with the first bit mapped service table shown in FIG. 13 is compactly represented by the series of hexadecimal characters "OB8E042F" in the map table field 82 of the user data table shown in FIG. 12.

The subscription status of the services corresponding to the hexadecimal characters are determined by converting the hexadecimal characters into four bit binary numbers. For example, in the table shown in FIG. 13, the status of the services in the first group are determined by converting the hexadecimal number "F" into the binary number "1111". The value of each bit in the binary number indicates whether a corresponding phone call service has been subscribed to by the user. In the above example, the binary number "1111" indicates that the four services corresponding to the first four bit positions in the user identification bit field 88 of the first bit mapped service table have all been subscribed to.

By way of further examples, since, as shown in FIG. 12, the subscription status of the services associated with the second bit mapped service table are represented by the hexadecimal value "00000000", none of the thirty-two possible services associated with that table have been subscribed to and, as shown in FIG. 14, the bit state of every bit in the user identification bit field 88 is "0". Similarly, because the subscription status of the third bit mapped service table are represented by the hexadecimal value "11111111", the services corresponding to the bit positions numbered 0, 4, 8, 12, 16, 20, 24, and 28 in the service identification field 86 of the third bit mapped service table have been subscribed to as shown in FIG. 15.

Although in the preferred embodiment, the service identification field 86 employs the hexadecimal coding system discussed above to represent a subscription package for one or more users associated with a single subscription, persons of ordinary skill in the art will appreciate that other approaches to identifying the subscribed to services may be employed without departing from the scope or spirt of the invention. For example, pathnames to the logic maps associated with the subscribed to services could be listed in the service identification field 86 without departing from the scope or spirit of the invention.

The final field in the user data table shown in FIG. 12 is a group identification value (GID) field 84. The GID field 84 represents a sub-grouping identifier. As stated above several individual phone numbers and/or phone number ranges can be associated with a single main subscription. This sub-group allows individual number or number ranges to control service options at the sub-group level. It also allows multiple individual subject rows (as depicted in FIG. 12) to share options. As an example, the service specified by the bit position 0 of Table 1 in field 86 of FIG. 12 is subscribed to by the subscribers at number (555) 123-4567 and (555) 123-4633. Nonetheless, the time range values for the phone number (555) 123-4567 could be different from those specified for the phone number (555) 123-4633 even though they are numbers of the same main subscription number as specified in field 80.

Returning to FIG. 10B, after either the user specific data (block 72) or the default subscriber data (block 66) is stored in the subscriber call record, the service identifier 34 searches a trigger table stored in the trigger database 16 for services associated with the trigger criteria type corresponding to the query event message received by the SAM 30 (block 90). A simplified example of a trigger table is shown in FIG. 16. As shown in that figure, the trigger table maps each trigger criteria type (e.g. termination attempt, off-hook delay, etc) to one or more phone call services. The individual trigger criteria types allow several services to be defined and are directly indexed in groups of 100. For example, the trigger criteria type at index "100" is mapped to a default service, to a service called "FES" and to a services called "Service X." By way of another example, the trigger criteria type at index "800" is mapped to a default service and to a service named "Service Y." Preferably, each trigger criteria type can be mapped to up to 100 separate services (see the trigger type at index 1800).

As also shown in FIG. 16, the trigger map includes a "Map Table Number" field 92 and a "Bit Number" field 94. These fields identify the positions of the services in the bit mapped service tables illustrated in FIGS. 13–15. For example, the service at index "101" under the trigger criteria type at index 100 is "FES." The subscription status of the service FES is specified by bit number 2 of bit mapped service table number 1. Thus, in the example shown in FIGS. 13–15, the FES service has been subscribed to because a "1" appears in bit number 2 of the first bit mapped service table (FIG. 13).

Significantly, the services corresponding to each trigger criteria type are listed in the trigger table in a prioritized fashion. Specifically, the services having higher priority are listed above services having lower priority in the trigger table. For example, the service "FES" has a higher priority than Service X when called by the trigger criteria type at index "100" and service "FES" is accordingly listed above "Service X" under the trigger criteria type at index "100" in the trigger table shown in FIG. 16. The same service can be mapped to more than one trigger criteria type. When this occurs, the relative priorities of the listed services do not have to be the same for all trigger criteria types. For example, although the trigger criteria types at indexes "100" and "300" are both mapped to a default service, to FES, and to Service X, in this example, the service "FES" has higher priority than Service X when called in response to the trigger criteria type at index "100," but the opposite is true when those services are called in response to the trigger criteria type at index "300."

Persons of ordinary skill in the art will appreciate that, if desired, the service identifier 34 could employ the list associated with the trigger criteria type in question contained in the trigger table as the mapped services list without copying the service list to another location without departing from the scope or spirit of the invention. However, in the illustrated embodiment, after the service identifier 34 locates the trigger criteria type associated with the received query event message in the trigger table, it copies the services specified in the trigger table as being associated with the trigger criteria type to a mapped services list. For example, if trigger criteria type "300" is associated with the query event message, the service identifier writes services "300 Default," Service X, FES and Service N to the mapped service list as shown in FIG. 7.

As shown in FIG. 16, the first service specified for each trigger criteria type is preferably a default service. Unlike prior art systems, the default services specified in the SAM 30 preferably comprise predefined services implemented by a logic map and one or more decision graph nodes. In other words, the default services of the SAM 30 are implemented in the same manner as other normal services offered by the SCP 6. This approach enables the SCP 6 to handle errored calls and the like in a controlled, predefined manner. This approach is advantageous in that it is extremely flexible. Errored calls can be processed in any manner desired by the RBOC. For example, the RBOC can program the SCP 6 to provide the user with a computerized voice error message explaining the error to the calling party whenever an errored call is received. In contrast to the flexibility offered by the SAM 30, prior art systems could only handle errored calls in one of two ways. It could fail to connect the call, or it could connect the call without providing the requested service. In either event, the parties to the call were left with no explanation as to the error.

As shown in FIG. 16, the SCP 6 can be provisioned with more than one default service. For example, the default service for the trigger criteria type at index "100" is different from the default service for the trigger criteria type at index "300" as demonstrated by the fact that the default service for the trigger criteria type at index "100" is mapped to bit number 4 of bit mapped service table 3 and the default service for the trigger criteria type at index "300" is mapped to bit number 31 of bit mapped service table 1. This ability to define different default services enables the SAM 30 to respond differently to different types of errored calls.

Since the default service for each trigger criteria type is specified in the trigger table, a predetermined default service is included in the mapped service list for each query event message. In addition, in instances where the service identifier 34 cannot find the trigger criteria type associated with the query event message in the trigger table, or when the query event message is errored or indecipherable, a predetermined default service is included in the mapped services list (block 96).

If one or more non-default services are specified in the mapped services list, the active services list compiler 36 compares the first non-default service in the mapped services list to the subscribed to services in the subscription services list (block 98). If the first non-default service is subscribed to, the active services list compiler 36 searches the service spec table (block 100) and verifies that the subject service is active (block 104). If it is active, the active services list compiler 36 stores a representation of the subscribed to service in the active services list (block 106).

The active services list compiler 36 determines whether a subscribed to service in question is active by consulting a service specification table stored in the trigger database 16. A representative example of a service specification table is shown in FIG. 17. As shown in that figure, the service specification table maps representations of the various phone call services implemented by the SCP 6 to path names to the logic maps in the logic map database 20 used to implement those services. The path names are stored in logic map pathname fields 108 in the service specification table. The service specification table also includes an active status field 110 for each service. The active status field 110 has a first programmable state wherein the associated phone call service is activated for subscribing users and a second programmable state wherein the associated phone call service is deactivated for all users. The active status fields preferably each include one bit. If the bit in an active status field is set to "1," the associated service is active. If the bit is set to "0," the associated service is deactivated. For instance, in the example shown in FIG. 17, the services "100 default," "FES" and "ACC" are all active, and Service X is deactivated.

In view of the foregoing, persons of ordinary skill in the art will appreciate that the SAM 30 is advantageous in that any service provided by the SCP 6 can be immediately brought on-line or taken off line by changing the state of one bit in the service specification table, namely the bit in the active status field 110. Persons of ordinary skill in the art will further appreciate that modified services can be nearly instantaneously brought on-line by changing the pathname identified in the logic map pathname field 108 to a new pathname addressing the new logic map. For example, if the service FES is to be updated by changing its logic map, the new logic map can be created and, once completed (and preferably tested), brought immediately on-line by changing the pathname in the pathname field 108 for the FES service (e.g., changing "FES=FES.1" to "FES=FES.2" in field 108).

Returning to FIGS. 10B–10C, if the first non-default service in the mapped services list is not subscribed to (block 98), the first non-default service in the mapped services list is not active (block 104), or the active services list compiler 36 has recorded the first non-default service in the active services list (block 106), control proceeds to block 112. (See FIG. 10C.) At block 112, the active services list compiler 36 determines whether there are any more services in the mapped services list to examine. If so, control returns to block 98. The active services list compiler 36 continues looping through blocks 98, 100, 102, 104, 106, and 112 until every non-default service in the mapped services list has been checked to determine if it is present in the subscription services list. When every service in the mapped services list has been so checked, the active services list will have been completed and control proceeds to block 114.

Significantly, because the active services list compiler 36 compares the services in the mapped services list to the services in the subscription services list in the order specified in the mapped services list, it writes the services in the active services list in the order specified in the mapped services list. In other words, the priority of services specified in the mapped services list is identified in the active services list. As a result, as explained further below, the service manager 38 can execute the services in the active services list in the order specified by the mapped services list.

At block 114, the active services list compiler 36 determines if any services are present in the active services list. If not, (i.e., if the telephone call services present in the subscription services list are mutually exclusive of the telephone call services present in the mapped services list), the active services list compiler 36 indicates the default service should be executed. Control then proceeds to block 115 where the service manager 38 executes the default service specified in the active services list and outputs a response message to the AIN.

If there are services specified in the active services list (block 114) control proceeds to block 118. The history recorder 40 records the usage of the executed service along with the identity of the competitive local exchange carrier (which may be the RBOC that owns the SCP 6) for later use in billing and usage demographics development (block 118). As discussed above, the history recorder 40 also develops a database showing how frequently each service offered by the SCP 6 is executed. At block 120, the service control module 42 retrieves the logic map associated with the first service listed in the active services list from the logic map database 20. It then retrieves and executes the decision graph nodes identified in the logic map from the decision graph node database 18. The service control module 42 executes the decision graph nodes in the order specified in the logic map. The results of the execution of the service are written to an "out message" record.

At block 122, the service manager 38 determines whether the executed service requires immediate response. If so, the out message is output by the SCP 6 to the AIN (block 124). As mentioned above, services are listed in the active services list in the order specified in the mapped services list (and, thus, in the order specified in the trigger table). The ordering of these lists is preferably informed by the possible presence of services requiring immediate response. Specifically, if a service requires immediate response upon execution, any remaining services in the active services list will not be executed by the service manager 38. As a result, when ordering services in the trigger table, the order should be carefully selected such that services whose execution cannot be skipped are listed before services requiring immediate response.

If, at block 122, it is determined that immediate response is not required, control proceeds to block 126. At block 126, the service control module 42 determines whether any unexecuted services remain in the active services list. If not, control proceeds to block 124, and a response message associated with the executed service(s) is output to the AIN. Otherwise, control proceeds to block 128.

At block 128, the service control module 42 writes the results of the execution of the current service into an "in message" record. The "in message" record is used by the next service as the starting point for processing a call (i.e., as the new "out message"). This merging of the out message and the in message is important to ensure that the effects of performing a service are not lost during the performance of subsequent services. The current "out message" is then discarded.

The service control module 42 then continues through blocks 118–128 until all services listed in the active services list have been performed (block 126), or until a service requiring an immediate response has been executed (block 122). When either of these events occur, the current out message is output to the AIN (block 124).

From the foregoing, persons of ordinary skill in the art will readily appreciate that the disclosed service package application 10 and service activation manager 30 are advantageous over prior art in many respects. For example, the disclosed systems are advantageous in that new or modified services comprising new ordered combinations of pre-existing decision graph nodes can be added to the AIN system without adding new subsystem numbers (SSNs) or new queries to the AIN. The new or modified services are added to the system by mapping them to a pre-existing trigger criteria type (e.g., by adding the service to the trigger table at an appropriate location). Thus, new or modified services can be added to the system without modifying or adding new software to any of the STPs of the AIN.

By way of a more concrete example, if an RBOC wishes to add a new service consisting of a new combination of existing decision graph nodes to the SCP 6, the RBOC first stores the logic map corresponding to the new service in the logic database 20. The new service is assigned one of the positions in one of the bit mapped service tables (see FIG. 13). Any subscriptions to the new service are then noted in the map table field 82 of the user data table (see FIG. 12). The new service is then associated with a trigger criteria type and added to the trigger table (see FIG. 16) at one or more appropriate location(s) reflecting the services association with the trigger criteria type(s) and its priority position within the hierarchy of services associated with each such trigger criteria type. The new service is then added to the service specification table (see FIG. 17). The new service is listed in the service specification table by the representation used to identify it in the other tables (e.g., by service name). The pathname to the logic map associated with the new service is also written in the service specification table in the logic map pathname field 108. Finally, when the service is ready for activation, the active status bit in the active status field 110 is set to "1".

As will be appreciated by persons of ordinary skill in the art, this process of bringing a new service on-line did not require the addition of new SSNs, and did not require any modifications to the STPs of the AIN. Moreover, as will also be appreciated by persons skilled in the art, the STPs need not translate queries for the SCP processor to process the requested service. More specifically, because the SCP does not rely on SSNs to identify the subscribed-to services, the SAM 30 can identify a subscriber from a query and can use the identity of the subscriber to access the subscriber database 14 to identify a subscribed-to service which is not specifically identified by an SSN in the query and to call and execute the identified service. Because the new service used pre-existing decision graph nodes, bringing the service on-line also did not require execution of a SPFU and SPVM.

Bringing modified services on-line is also a simple process with the disclosed SPA 10 and SAM 30. For example, if a new logic map is created for a modified service, and if the modified service employs pre-existing decision graph nodes, the modified service is brought on line by simply replacing the pathname for the old version of the service with the pathname for the logic map of the new version of the service in the service specification table (FIG. 17). Again, if only pre-existing decision graph nodes are employed in the modified service, no SPFU and SPVM needs to be run to bring the modified service on-line. In addition, no changes need to be made to the user data table to bring the modified service on-line. Thus, modifying services does not require either modification to or a transfer of subscription information in the subscriber database 14. As with adding a new service, modifying a service does not require adding or changing any SSNs or modifications of any of the STPs in the AIN.

Persons of ordinary skill in the art will appreciate that, unlike prior art systems, the disclosed SPA 10 and SAM 30 are also advantageous in that a subscriber can subscribe to more than one service without requiring the creation of a new service combining the subscribed-to services. On the contrary, the disclosed SAM 30 and SPA 10 are constructed to sequentially call any combination of services associated with a trigger criteria type as specified in the trigger table.

Persons of ordinary skill in the art will appreciate that, although in the disclosed embodiment, services are identified in the trigger table (FIG. 16) by reference to a bit number in a bit mapped service table, they could optionally be identified by the pathname of their associated logic map without departing from the scope or spirit of the invention.

Furthermore, those skilled in the art will further appreciate that, although the invention has been described in connection with certain embodiments, there is no intent to limit the invention thereto. On the contrary, the intention of this application is to cover all modifications and embodiments fairly falling within the scope of the appended claims either literally or under the doctrine of equivalents.

What is claimed is:

1. A service package application for use with a service control point in an advanced intelligent network, the service package application comprising:

a first database storing a plurality of decision graph nodes, each decision graph node comprising a routine for performing at least one predefined function;

a first logic map identifying a first logically ordered combination of the decision graph nodes stored in the first database for processing a phone call in a first predefined manner, wherein executing at least a subset of the decision graph nodes in the first logically ordered combination performs a first phone call service;

a second logic map identifying a second logically ordered combination of the decision graph nodes stored in the first database for processing a phone call in a second predefined manner, the second predefined manner being different from the first predefined manner, wherein executing at least a subset of the decision graph nodes in the second logically ordered combination performs a second phone call service, the second phone call service being different from the first phone call service;

a second database storing the first and second logic maps; and a service activation manager in communication with the first and second databases, the service activation manager being responsive to phone calls requiring processing in accordance with the first phone call service to retrieve the first logic map from the second database and to retrieve at least one of the decision graph nodes identified in the first logic map from the first database, and being responsive to phone calls requiring processing in accordance with the second phone call service to retrieve the second logic map from the second database and to retrieve at least one of the decision graph nodes identified in the second logic map from the first database.

2. A service package application as defined in claim 1 wherein the decision graph nodes identified in the first logically ordered combination are mutually exclusive of the decision graph nodes identified in the second logically ordered combination.

3. A service package application as defined in claim 1 wherein at least one of the decision graph nodes identified in the first logically ordered combination is the same as at least one of the decision graph nodes identified in the second logically ordered combination.

4. A service package application as defined in claim 1 wherein, if the decision graph nodes retrieved by the service activation manager are retrieved in accordance with the first logic map, the decision graph nodes are executed in the order specified by the first logic map.

5. A service package application as defined in claim 4 wherein at least one of the decision graph nodes identified in the first logically ordered combination is the same as at least one of the decision graph nodes identified in the second logically ordered combination, and wherein, if the decision graph nodes retrieved by the service activation manager are retrieved in accordance with the second logic map, the decision graph nodes are executed in the order specified by the second logic map.

6. A service package application as defined in claim 1 further comprising a table identifying services subscribed to by users.

7. A service package application as defined in claim 6 wherein the first service is identified in the table by a pathname to the first logic map stored in the second database.

8. A service package application as defined in claim 6 wherein the services subscribed to by the user are identified in a hexadecimal bit map field in the table.

9. A service package application as defined in claim 8 wherein the hexadecimal bit map field maps a hexadecimal character to four predefined services, and the subscription status of the four predefined services are determined by converting the hexadecimal character into a four bit binary number.

10. A service package application as defined in claim 9 wherein the value of each bit in the binary number indicates whether a corresponding phone call service has been subscriber to by the user.

11. A service package application as defined in claim 9 wherein a first bit position in the binary number is associated with the first phone call service, a second bit position in the binary number is associated with the second phone call service, a third bit position in the binary number is associated with a third phone call service, and a fourth bit position in the binary number is associated with a fourth phone call service.

12. A service package application as defined in claim 11 wherein the value of the first bit indicates whether the user has subscriber to the first phone call service, the value of the second bit indicates whether the user has subscriber to the second phone call service, the value of the third bit indicates whether the user has subscriber to the third phone call service, and the value of the fourth bit indicates whether the user has subscriber to the fourth phone call service.

13. A service package application as defined in claim 1 further comprising a service specification table mapping a representation of the first phone call service to a pathname to the first logic map and mapping a representation of the second phone call service to a pathname to the second logic map.

14. A service package application as defined in claim 13 wherein the service specification table includes an active status field associated with the first phone call service, the active status field having a first programmable state wherein the first phone call service is activated for subscribing users and a second programmable state wherein the first phone call service is deactivated.

15. A service package application as defined in claim 14 wherein the first phone call service can be deactivated for all users by setting the active status field to the second programmable state.

16. A service package application as defined in claim 1 wherein a third phone call service can be added to the service control point by storing a third logic map in the second database, the third logic map identifying a third logically ordered combination of the decision graph nodes stored in the first database for processing a phone call in a third predefined manner, the third predefined manner being different from the first and second predefined manners, wherein executing at least a subset of the decision graph nodes in the third logically ordered combination is required to perform the third phone call service, the third phone call service being different from the first and the second phone call services.

17. A service package application as defined in claim 16 further comprising a first table identifying services subscribed to by users, wherein the third phone call service is added by listing a first representation of the third phone call service in the first table for users subscribing to the third phone call service.

18. A service package application as defined in claim 17 further comprising a second table mapping query events to the phone call services, wherein, when the third phone call service is added, a second representation of the third phone call service is added to the second table in at least one position to map at least one query event to the third phone call service.

19. A service package application as defined in claim 18 wherein the second representation of the third phone call event comprises a pathname to the third logic map stored in the second database.

20. A service package application as defined in claim 18 further comprising a third table mapping a representation of the first phone call service to a pathname to the first logic map and mapping a representation of the second phone call service to a pathname to the second logic map, wherein, when the third phone call service is added, the second representation of the third phone call service and a pathname mapping the second representation to the third logic map is added to the third table.

21. A service package application as defined in claim 18 wherein the third phone call service is mapped to a pre-existing query event without adding system sub-numbers to the advanced intelligent network.

22. A service package application as defined in claim 1 further comprising a table mapping query events to the first and second phone call services.

23. A service package application as defined in claim 22 wherein a first query event maps to the first phone call service.

24. A service package application as defined in claim 22 wherein a first query event maps to the first and the second phone call services.

25. A service package application as defined in claim 24 further comprising a second table identifying services subscribed to by users, wherein the service activation manager determines whether to retrieve the first logic map, the second logic map, or both, by addressing the second table.

26. A service package application as defined in claim 1 wherein the service activation manager responds to phone calls requiring processing in accordance with the first phone call service by sequentially executing the decision graph nodes retrieved from the first database in the order specified in the first logically ordered combination.

27. A service package application as defined in claim 26 wherein the service activation manager responds to phone calls requiring processing in accordance with the second phone call service by sequentially executing the decision graph nodes retrieved from the first database in the order specified in the second logically ordered combination.

28. A service activation manager for use with a service control point in an advanced intelligent network, the service activation manager comprising:
a subscriber identifier in communication with a subscriber database, the subscriber identifier identifying a user associated with a phone call from a query event message developed by the advanced intelligent network, the subscriber identifier cooperating with the subscriber database to develop a subscription services list of phone call services subscribed to by the identified user;
a service identifier in communication with a trigger database, the service identifier accessing the trigger database to identify a mapped services list of phone call services mapped to the query event message;
an active services list compiler cooperating with the subscriber identifier and with the service identifier to develop an active services list containing the phone call services present in both the subscription services list and mapped services list; and
a service manager cooperating with the active services list compiler for sequentially executing the phone call services contained in the active services list.

29. A service activation manager as defined in claim 28 wherein, if the user is not identified in a routing table stored in the subscriber database and the user is a called party, the service manager executes a predefined service.

30. A service activation manager as defined in claim 29 wherein the predefined service is a caller identification service wherein the identity of a calling party associated with the phone call is delivered to the called party.

31. A service activation manager as defined in claim 28 wherein users are identified in the subscriber database by phone number.

32. A service activation manager as defined in claim 28 wherein the subscriber database includes an identification of a local exchange carrier associated with the user.

33. A service activation manager as defined in claim 32 further comprising a history recorder cooperating with the subscriber identifier and the active services list compiler to store a representation of the services delivered to the user in association with a stored representation of the local exchange carrier identified in the subscriber database as being associated with the user.

34. A service activation manager as defined in claim 28 further comprising a history recorder cooperating with the active services list compiler to develop a record of the number of times each of the phone call services is accessed over a predefined time period to provide usage data.

35. A service activation manager as defined in claim 28 wherein, if the user is not identified in the subscriber database and the user is a calling party, the subscriber identifier stores a default subscriber representation in the subscription services list.

36. A service activation manager as defined in claim 35 wherein, if the default subscriber representation is present in the subscription services list, the active services list compiler stores a representation of a default service associated with the query event message in the active services list.

37. A service activation manager as defined in claim 36 wherein the default service associated with the query event message is implemented by executing at least one decision graph node.

38. A service activation manager as defined in claim 28 wherein, if the telephone call services present in the subscription services list are mutually exclusive of the telephone call services present in the mapped services list, the active services list compiler stores a default service associated with the query event message in the active services list.

39. A service activation manager as defined in claim 38 wherein the default service associated with the query event message is implemented by executing at least one decision graph node.

40. A service activation manager as defined in claim 28 wherein the subscriber database records the phone call services subscribed to by the user as a series of hexadecimal characters, wherein each hexadecimal character represents the subscription status of four predefined phone call services.

41. A service activation manager as defined in claim 28 wherein the phone call services subscribed to by the user are identified in a hexadecimal bit map field in the subscriber database.

42. A service activation manager as defined in claim 41 wherein the hexadecimal bit map field maps a hexadecimal character to four predefined services, and the subscription status of the four predefined services are determined by converting the hexadecimal character into a four bit binary number.

43. A service activation manager as defined in claim 42 wherein the value of each bit in the binary number indicates whether a corresponding phone call service has been subscriber to by the user.

44. A service activation manager as defined in claim 42 wherein a first bit position in the binary number is associated with a first predefined phone call service, a second bit position in the binary number is associated with a second predefined phone call service, a third bit position in the binary number is associated with a third predefined phone call service, and a fourth bit position in the binary number is associated with a fourth predefined phone call service.

45. A service activation manager as defined in claim 44 wherein the value of the first bit indicates whether the user has subscriber to the first phone call service, the value of the second bit indicates whether the user has subscriber to the second phone call service, the value of the third bit indicates whether the user has subscriber to the third phone call service, and the value of the fourth bit indicates whether the user has subscriber to the fourth phone call service.

46. A service activation manager as defined in claim 28 further comprising a service specification table mapping a representation of a first phone call service to a pathname to a first logic map associated with the first phone call service.

47. A service activation manager as defined in claim 46 wherein the service manager cooperates with a decision graph node database storing a plurality of decision graph nodes, each decision graph node comprising a routine for performing at least one predefined function; and wherein the first logic map identifies a first logically ordered combination of the decision graph nodes stored in the decision graph node database for processing a phone call in a first predefined manner, and executing at least a subset of the decision graph nodes in the first logically ordered combination is required to perform the first phone call service.

48. A service activation manager as defined in claim 46 wherein the service specification table includes an active status field, the active status field having a first programmable state wherein the first phone call service is activated for subscribing users and a second programmable state wherein the first phone call service is deactivated.

49. A service activation manager as defined in claim 48 wherein the first phone call service can be deactivated for all users by setting the active status field to the second programmable state.

50. A service activation manager as defined in claim 28 wherein the phone call services are prioritized in the mapped services list, and the priority of the phone call services in the mapped services list is identified in the active services list such that the service manager executes the phone call services in the active services list in the order specified by the mapped services list.

51. A service activation manager as defined in claim 50 wherein if one of the phone call services listed in the active services list requires immediate response, the remaining services in the active services list are not executed by the service manager.

52. A method for identifying phone services subscribed to by a user comprising:
(a) defining a service identification field including a plurality of unique positions;
(b) associating each of the unique positions in the service identification field with one of a plurality of phone call services;
(c) defining a user identification bit field having a plurality of unique bit positions;
(d) associating each of the unique bit positions in the user identification bit field to a corresponding one of the unique positions in the service identification field; and
(e) indicating which of the plurality of phone call services a user subscribes to by placing a bit having a predefined bit state in the unique bit positions of the user identification field corresponding to the subscribed to phone call services.

53. A method a recited in claim 52 further comprising:
(f) representing the bit states of the bits in the bit positions in the user identification field in a hexadecimal format.

54. A method as defined in claim 53 wherein (f) comprises:
(f1) grouping the bit positions in the user identification field into groups of four positions; and
(f2) representing a binary number corresponding to the bit states of the bits in each group of four bit positions as a hexadecimal character.

55. A method as defined in claim 52 wherein the predefined bit state comprises a 1.

56. A method as defined in claim 52 wherein the predefined bit state comprises a 0.

* * * * *

UNITED STATES PATENT AND TRADEMARK OFFICE
CERTIFICATE OF CORRECTION

PATENT NO. : 6,556,996 B1 Page 1 of 1
DATED : April 29, 2003
INVENTOR(S) : James Daniel Kovarik et al.

It is certified that error appears in the above-identified patent and that said Letters Patent is hereby corrected as shown below:

Column 20,
Lines 7 and 8, delete "subscriber" and substitute -- subscribed -- in its place.
Lines 19, 20, 22 and 24, delete "subscriber" and substitute -- subscribed -- in its place.

Column 22,
Lines 66 and 67, delete "subscriber" and substitute -- subscribed -- in its place.

Column 23,
Lines 11, 12, 14 and 16, delete "subscriber" and substitute -- subscribed -- in its place.

Column 24,
Line 28, before "recited" delete "a" and substitute -- as -- in its place.

Signed and Sealed this

Twenty-seventh Day of April, 2004

JON W. DUDAS
*Acting Director of the United States Patent and Trademark Office*